(12) United States Patent
Chen et al.

(10) Patent No.: US 12,401,589 B2
(45) Date of Patent: Aug. 26, 2025

(54) SIGNALING CONFIGURATION METHOD AND APPARATUS FOR BIER NETWORK, AND STORAGE MEDIUM

(71) Applicant: ZTE CORPORATION, Shenzhen (CN)

(72) Inventors: Ran Chen, Shenzhen (CN); Chun Zhu, Shenzhen (CN); Zheng Zhang, Shenzhen (CN); Jinghai Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 476 days.

(21) Appl. No.: 17/909,324

(22) PCT Filed: Jan. 20, 2021

(86) PCT No.: PCT/CN2021/072833
§ 371 (c)(1),
(2) Date: Oct. 20, 2022

(87) PCT Pub. No.: WO2021/175030
PCT Pub. Date: Sep. 10, 2021

(65) Prior Publication Data
US 2023/0090204 A1    Mar. 23, 2023

(30) Foreign Application Priority Data
Mar. 3, 2020  (CN) .......................... 202010140287.3

(51) Int. Cl.
*H04L 45/50* (2022.01)
*H04L 12/46* (2006.01)
(Continued)

(52) U.S. Cl.
CPC ........ *H04L 45/507* (2013.01); *H04L 12/4633* (2013.01); *H04L 45/16* (2013.01); *H04L 45/24* (2013.01)

(58) Field of Classification Search
None
See application file for complete search history.

(56) References Cited

U.S. PATENT DOCUMENTS

| | | |
|---|---|---|
| 2010/0039939 A1 | 2/2010 | Wang |
| 2015/0103844 A1 | 4/2015 | Zhao et al. |

(Continued)

FOREIGN PATENT DOCUMENTS

| | | |
|---|---|---|
| CN | 106572050 A | 4/2017 |
| CN | 107637031 A | 1/2018 |

(Continued)

OTHER PUBLICATIONS

International Search Report for Application No. PCT/CN2021/072833, dated Apr. 12, 2021, 4 pages including translation.

(Continued)

*Primary Examiner* — Jeffrey M Rutkowski
*Assistant Examiner* — Justin Michael Whitaker
(74) *Attorney, Agent, or Firm* — Morgan, Lewis & Bockius LLP (57) ABSTRACT

Provided are a signaling configuration method and apparatus for a BIER network, and a storage medium. The signaling configuration method for a BIER network includes: informing, by a PCE and a PCC each other, of a PCECC capability support message, wherein the PCECC capability support message is configured for indicating that the establishment of an extended BIER network path is supported, and the PCC comprises each BFR in the BIER network; allocating, by the PCE, extended BIER network information to each BFR in the BIER network; and receiving, by the PCE, a (Continued)

message about successful installation of the extended BIER network information sent by the PCC.

18 Claims, 5 Drawing Sheets

(51) Int. Cl.
  *H04L 45/16* (2022.01)
  *H04L 45/24* (2022.01)

(56) References Cited

U.S. PATENT DOCUMENTS

2016/0373997 A1* 12/2016 Petersen .............. H04W 72/20
2018/0287935 A1* 10/2018 Wang .................. H04L 12/4625
2019/0075041 A1* 3/2019 Wang .................... H04L 41/342

FOREIGN PATENT DOCUMENTS

| CN | 109076014 A | 12/2018 |
| CN | 109314663 A | 2/2019 |
| CN | 109417511 A | 3/2019 |

OTHER PUBLICATIONS

Chinese Office Action for Application No. 2020101402873, dated Jul. 24, 2023, 29 pages including translation.
Chinese Search Report for Application No. 2020101402873, dated Jul. 20, 2023, 7 pages including translation.

* cited by examiner

SIGNALING CONFIGURATION METHOD AND APPARATUS FOR BIER NETWORK, AND STORAGE MEDIUM

CROSS REFERENCE TO RELATED APPLICATIONS

This is a National Stage Application, filed under 35 U.S.C. 371, of International Patent Application No. PCT/CN2021/072833, filed on Jan. 20, 2021, which is based on and claims priority to Chinese Patent Application No. 202010140287.3 filed with the China National Intellectual Property Administration (CNIPA) on Mar. 3, 2020, the disclosure of which is incorporated herein by reference in its entirety."

This application claims priority to Chinese Patent Application No. 202010140287.3 filed with the China National Intellectual Property Administration (CNIPA) on Mar. 3, 2020, the disclosure of which is incorporated herein by reference in its entirety.

TECHNICAL FIELD

The present application relates to network technologies, for example, to a signaling configuration method and apparatus for a Bit Indexed Explicit Replication (BIER) network, and a storage medium.

BACKGROUND

The Internet Protocol (IP) multicast technology enables efficient point-to-multipoint data transmission in an IP network. Such a technology can effectively save a network bandwidth and reduce a network load and thus, has been widely applied to real-time data transmission, multimedia conferencing, data replication, Internet Protocol televisions (IPTVs), gaming, simulation and many other aspects.

The multicast technology is generally implemented through Protocol-Independent Multicast (PIM) protocols. A common feature of these multicast protocols is the need to construct a control plane multicast tree by which a network plane is logically shaped into a tree, to achieve point-to-multipoint data forwarding and loop avoidance for multicast forwarding. The intermediate nodes of the multicast routing protocol with the construction of the distribution tree as the core all need to maintain the state of the complex multicast forwarding information. With the increasing scale of the network and the increasing multicast data traffic, such a multicast technology is facing the increasing cost and challenges in operation and maintenance.

In view of this, the industry has proposed a new technology called Bit Indexed Explicit Replication (BIER) for constructing a multicast forwarding path. The BIER technology presents a new multicast technical architecture that does not require multicast distribution tree construction. The BIER technology changes forwarding based on multicast distribution tree construction to multicast forwarding in a mode of unicast search and forwarding using a bit identifier, reducing forwarding costs in a network.

The Path Computation Element as a Central Controller (PCECC) is a dynamic bearer network control and deployment scheme proposed by the International Internet Engineering Task Force (IETF). The conventional label distribution requires protocols such as Label Distribution Protocol (LDP)/Resource Reservation Protocol-Traffic Engineering (RSVP-TE)/Border Gateway Protocol (BGP)/interior gateway protocol (IGP). To simplify the label allocation and the signaling mechanism, the Path Computation Element (PCE) may act as a centralized label controller and can support label download capabilities, compute a path using a PCE, and reserve or allocate traffic labels based on requests from users, clients and applications. The PCE downloads forwarding instructions to all network nodes in the network so that the network nodes are not required to adopt the LDP or RSVP-TE Multiprotocol Label Switching (MPLS) signaling protocol, maintain the state of label-switched paths (LSPs) or inform labels using the IGP and BGP, thereby improving the flexibility, availability, scalability and maintainability of the network.

However, in the related art, it is still cumbersome to use the PCECC for the label allocation and the signaling mechanism for the BIER network.

SUMMARY

The present application provides a signaling configuration method and apparatus for a BIER network, and a storage medium, thereby simplifying label distribution and signaling mechanism for the BIER network.

An embodiment of the present application provides a signaling configuration method for a BIER network. The method includes the following.

A PCE and a path computation client (PCC) inform each other of a PCECC capability support message, where the PCECC capability support message is configured for indicating that the establishment of an extended BIER network path is supported, and the PCC includes each bit-forwarding router (BFR) in the BIER network.

The PCE allocates extended BIER network information to each BFR in the BIER network.

The PCE receives a message about the successful installation of the extended BIER network information sent by the PCC.

An embodiment of the present application provides a signaling configuration method for a BIER network. The method includes the following.

A PCC and a PCE inform each other of a PCECC capability support message, where the PCECC capability support message is configured for indicating that the establishment of an extended BIER network path is supported, and the PCC includes one BFR in the BIER network.

The PCC receives extended BIER network information allocated by the PCE.

The PCC determines a next hop of the extended BIER network path using local routing information and downloads a corresponding forwarding indication.

The PCC sends to the PCE a message about the successful installation of the extended BIER network information.

An embodiment of the present application provides a PCE. The PCE includes a processor and a memory, where the processor is configured to execute program instructions stored in the memory to perform the signaling configuration method for a BIER network described above.

An embodiment of the present application provides a PCC. The PCC includes a processor and a memory, where the processor is configured to execute program instructions stored in the memory to perform the signaling configuration method for a BIER network described above.

An embodiment of the present application provides a computer-readable storage medium. The computer program stored on the storage medium, when executed by a processor, implements the signaling configuration method for a BIER network described above.

DETAILED DESCRIPTION

The embodiments of the present application are described below in conjunction with drawings.

Figure 1:
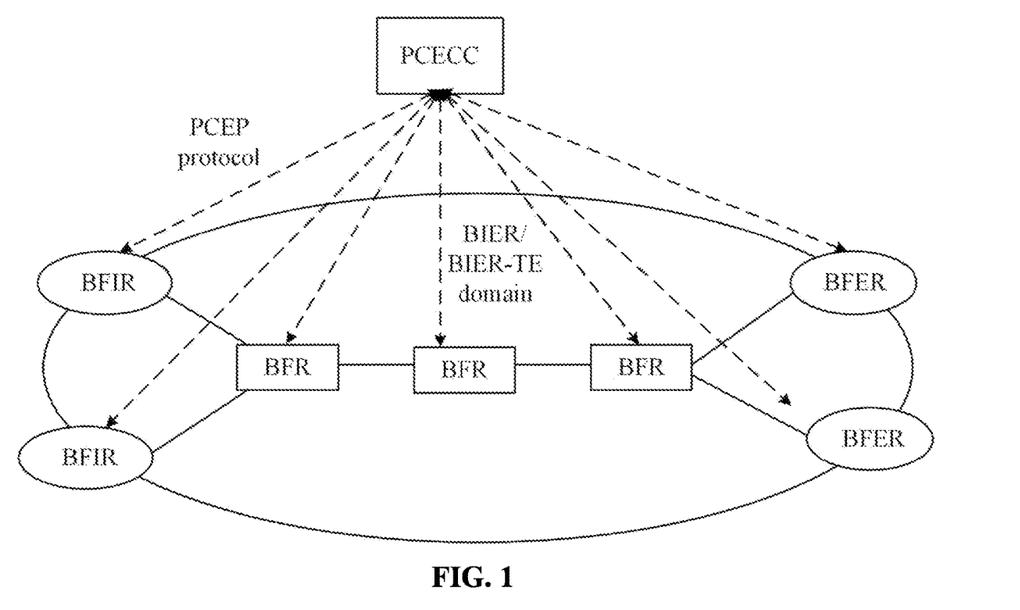
FIG. 1 is a network diagram of the BIER technology.

In the BIER domain, each edge bit-forwarding egress router (BFER) is allocated a globally unique bit position in the entire BIER sub-domain. Each BFER uses an IGP to perform flooding of its own bit position in the BIER domain. All bit positions form a bit string. Transmission and routing of the data packet in the BIER domain depend on the bit string. When receiving a message header containing BIER, another BFR forwards the message on the basis of a bit forwarding table according to the bit string carried in the message header. As shown in FIG. 1, FIG. 1 is a network diagram of the BIER technology. The BIER network includes bit-forwarding ingress routers (BFIRs), BFERs and BFRs located in the middle of the path, where the BFIR and the BFER both are a kind of BFR. The BFIR, the BFER and the BFR may be collectively referred to as path computation client (PCC). The PCE allocates a label to the PCC in the network, and the PCE sends a variety of control signaling. The BFIR, the BFER and the BFR are all located in the BIER domain (BIER network).

The Bit Index Explicit Replication-Traffic Engineering (BIER-TE) network is similar to the BIER network. The BIER-TE network forwards and replicates the message according to the bit string in the message header. The key differences of the BIER-TE network from the BIER network are as follows:

1) The explicit path computed by using a BIER-TE controller replaces the automatic path computation in the network for computation.

2) Each bit position in the bit string represents one or more adjacencies, rather than one BFER.

3) Only the bit index forwarding table (BIFT) is required in the BFR, and the routing table is not required.

Figure 2:
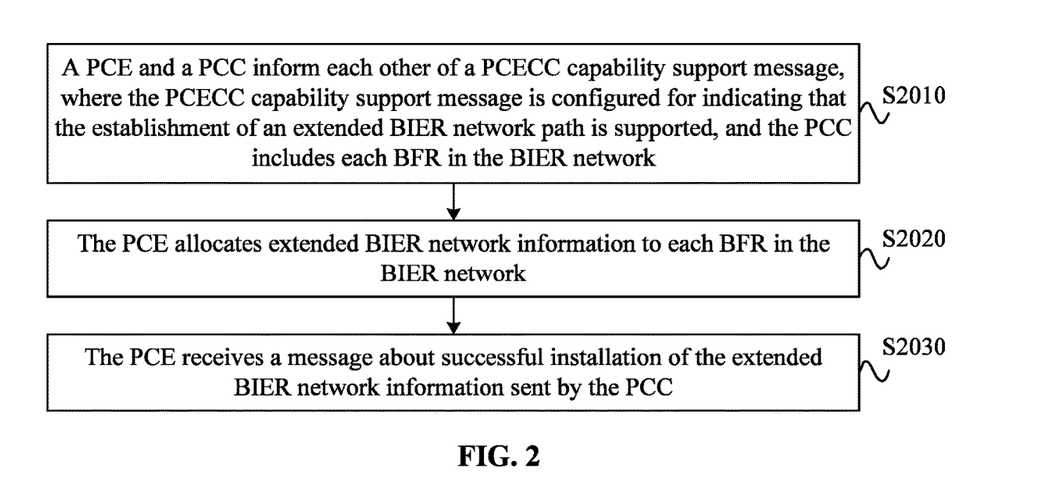
FIG. 2 is a flowchart of a signaling configuration method for a BIER network according to an embodiment.

FIG. 2 is a flowchart of a signaling configuration method for a BIER network according to an embodiment. As shown in FIG. 2, the method provided in this embodiment includes S2010, S2020 and S2030 described below.

In S2010, a PCE and a PCC inform each other of a PCECC capability support message, where the PCECC capability support message is configured for indicating that the establishment of an extended BIER network path is supported, and the PCC includes each BFR in the BIER network.

The signaling configuration method for a BIER network provided in this embodiment is applied by a PCE in the BIER network. To simplify the label distribution and the signaling mechanism for the BIER network, in this embodiment, the PCE and the PCC need to perform capability informing and inform each other that a PCECC capability is supported. The PCC may be a BFER, a BFIR or an intermediate BFR. The PCE and the PCC perform PCECC capability informing through the PCECC capability support message, where the PCECC capability support message is configured for indicating that the establishment of an extended BIER network path is supported. The extended BIER network path is a new type of path different from paths in the current protocols and aims at optimizing the label distribution mechanism and the signaling transmission mechanism for the BIER network. As long as both the PCE and the PCC support the establishment of the extended BIER network path, the PCE and the PCC can inform each other through the PCECC capability support message that the PCECC capability is supported.

In an embodiment, the PCC and the PCE inform each other of the PCECC capability support message through a Path Computation Element Communication Protocol (PCEP) open message.

In S2020, the PCE allocates extended BIER network information to each BFR in the BIER network.

When the PCE and the PCC inform each other of the PCECC capability support message, the PCE may allocate the extended BIER network information to each BFR in the BIER network, where each BFR in the network includes BFERs, BFIRs and other BFRs located in the extended BIER network path, that is, each BFR in the network includes multiple PCCs. The extended BIER network information allocated by the PCE to the PCC is configured for enabling each BFR to know the information required for routing and forwarding in the extended BIER network path so that traffic can be forwarded in the extended BIER network path.

In an embodiment, the PCE carries the extended BIER network information in a central controller's instruction (CCI) object and allocates the extended BIER network information to each BFR in the BIER network through at least one of the following messages: a PCEP initialization message, a PCEP advertisement message, a PCEP update message and other messages for establishing a BIER path.

In S2030, the PCE receives a message about the successful installation of the extended BIER network information sent by the PCC.

When the PCC receives the extended BIER network information allocated by the PCE and stores the extended BIER network information, the PCC sends to the PCE the message about the successful installation of the extended BIER network information. After the PCE receives messages, which are sent by all PCCs, of the successful installation of the extended BIER network information, the PCE can complete the signaling configuration process for the BIER network. That is, the network path is established in the BIER network, and multiple PCCs can complete traffic forwarding in the BIER network according to the configured information.

In the signaling configuration method for a BIER network provided in this embodiment, the PCE and the PCC inform each other of a PCECC capability support message for indicating that the establishment of an extended BIER network path is supported, where the PCC includes each BFR in the BIER network, the PCE allocates extended BIER network information to each BFR in the BIER network, and the PCE receives a message about the successful installation of the extended BIER network information sent by the PCC so that the signaling configuration for the BIER network is completed, thereby simplifying label distribution and signaling mechanism for the BIER network.

In an embodiment, the PCE allocates the extended BIER network information to each BFR in the BIER network in a time sequence. The PCE sequentially allocates the extended BIER network information to an egress node (BFER), an intermediate node (BFR) and an ingress node (BFIR) of the extended BIER network path in an order of the extended BIER network path. In this manner, after traffic forwarding is triggered, each node on the extended BIER network path can acquire the extended BIER network information allocated by the PCE to complete traffic forwarding on the extended BIER network path.

The PCE triggers traffic forwarding of the extended BIER network path after the PCE receives the message about the successful installation of the extended BIER network information sent by the ingress node. Since the network paths between multiple BFRs and the PCE are different, the order in which multiple BFRs receive the extended BIER network information allocated by the PCE may be different from the order in which the PCE allocates the extended BIER network information to the multiple BFRs. Therefore, to guarantee that each node on the extended BIER network path can acquire the extended BIER network information allocated by the PCE before traffic forwarding, the PCE triggers traffic forwarding of the extended BIER network path after the PCE receives the message about the successful installation of the extended BIER network information sent by the ingress node. Since the PCE finally sends the extended BIER network information to the ingress node, if the PCE receives the message about the successful installation of the extended BIER network information sent by the ingress node, the BFRs on the entire extended BIER network path should receive the extended BIER network information, and after that, the PCE starts to trigger traffic forwarding, thereby guaranteeing that the traffic forwarding is correct.

Figure 3:
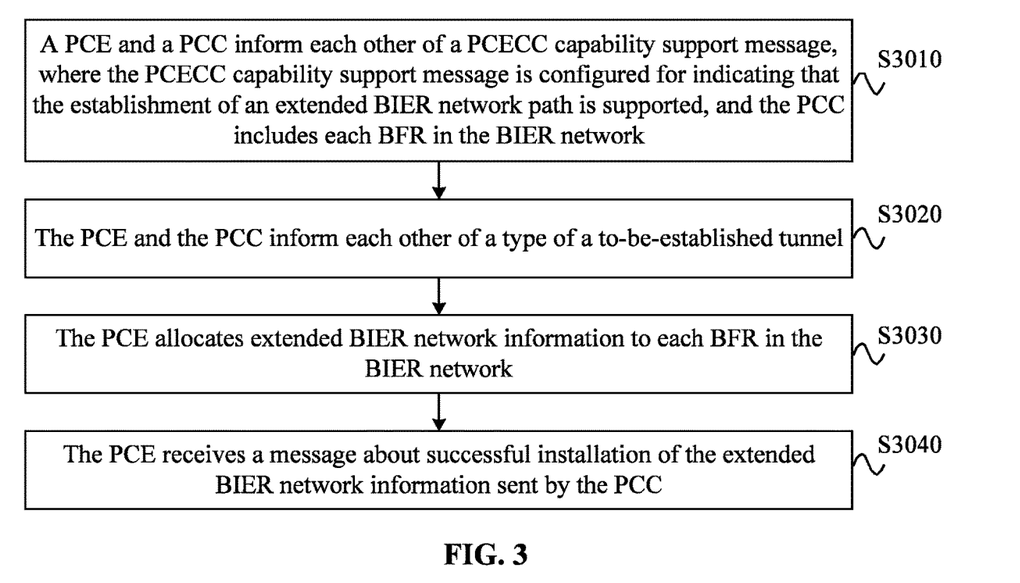
FIG. 3 is another flowchart of a signaling configuration method for a BIER network according to an embodiment.

FIG. 3 is another flowchart of a signaling configuration method for a BIER network according to an embodiment. As shown in FIG. 3, the method provided in this embodiment includes S3010, S3020, S3030 and S3040 described below.

In S3010, a PCE and a PCC inform each other of a PCECC capability support message, where the PCECC capability support message is configured for indicating that the establishment of an extended BIER network path is supported, and the PCC includes each BFR in the BIER network.

In S3020, the PCE and the PCC inform each other of a type of a to-be-established tunnel.

Since a BIER-TE network (or BIER-TE domain) also exists in addition to the BIER network (or BIER domain), there are different signaling configuration methods for different network paths in the BIER domain and the BIER-TE domain. Therefore, the PCE and the PCC may inform each other of both the PCECC capability support message and the type of the to-be-established tunnel. In this embodiment, a new path setup type needs to be extended to indicate the type of the to-be-established tunnel. After the PCE and the PCC inform each other of the type of the to-be-established tunnel, the PCE may allocate different types of extended BIER network information to the PCC according to different tunnel types.

In an embodiment, the extended BIER network path includes a Path Computation Element as a Central Controller-Bit Indexed Explicit Replication (PCECC-BIER) path, and the operation where the PCE and the PCC inform each other of the type of the to-be-established tunnel includes the following: the PCE and the PCC inform each other that the type of the to-be-established tunnel is the PCECC-BIER path; or, the extended BIER network path includes a Path Computation Element as a Central Controller-Bit Indexed Explicit Replication-Traffic Engineering (PCECC-BIER-TE) path, and the operation where the PCE and the PCC inform each other of the type of the to-be-established tunnel includes the following: the PCE and the PCC inform each other that the type of the to-be-established tunnel is the PCECC-BIER-TE path.

In an embodiment, the operation where the PCE and the PCC inform each other of the type of the to-be-established tunnel includes the following: the PCE and the PCC inform each other of the type of the to-be-established tunnel through at least one of the following messages: a PCEP initialization message, a PCEP advertisement message, a PCEP update message and other messages for establishing a BIER path.

In S3030, the PCE allocates extended BIER network information to each BFR in the BIER network.

If the extended BIER network path includes a PCECC-BIER path, the operation where the PCE allocates the extended BIER network information to each BFR in the BIER network includes the following: the PCE allocates BIER information to each BFR in the BIER network, where the BIER information includes at least one of the following: BIER sub-domain information, bit string length (BSL) information, a BFR identifier (ID) corresponding to a BFER, a BIER algorithm, an IGP algorithm, an ingress BIFT ID, an egress BIFT ID and a BFR next hop (which may be an egress interface or may be index information which is associated with an egress interface).

If the extended BIER network path includes a PCECC-BIER-TE path, the operation where the PCE allocates the extended BIER network information to each BFR in the BIER network includes the following: the PCE allocates BIER-TE information to each BFR in the BIER network, where the BIER-TE information includes at least one of the following: BIER sub-domain information, a set identifier (SI), a BitPosition of an adjacency, a type of an adjacency BitPosition, BSL information and a BIFT ID (which may be an MPLS label, an Ethernet encapsulation index or the like).

In S3040, the PCE receives a message about the successful installation of the extended BIER network information sent by the PCC.

If the extended BIER network path includes a PCECC-BIER path, the PCE receives a message about the successful installation of the BIER information sent by the PCC. If the extended BIER network path includes a PCECC-BIER-TE path, the PCE receives a message about the successful installation of the BIER-TE information sent by the PCC.

In an embodiment, in a case where one extended BIER network path is required to be modified, the PCE sends a path update message to the ingress node, where the path update message is configured for enabling the ingress node to download an updated bit index, switch traffic and clear an old bit index; and the PCE receives a path update response sent by the ingress node and clears an old extended BIER network path.

Figure 4:
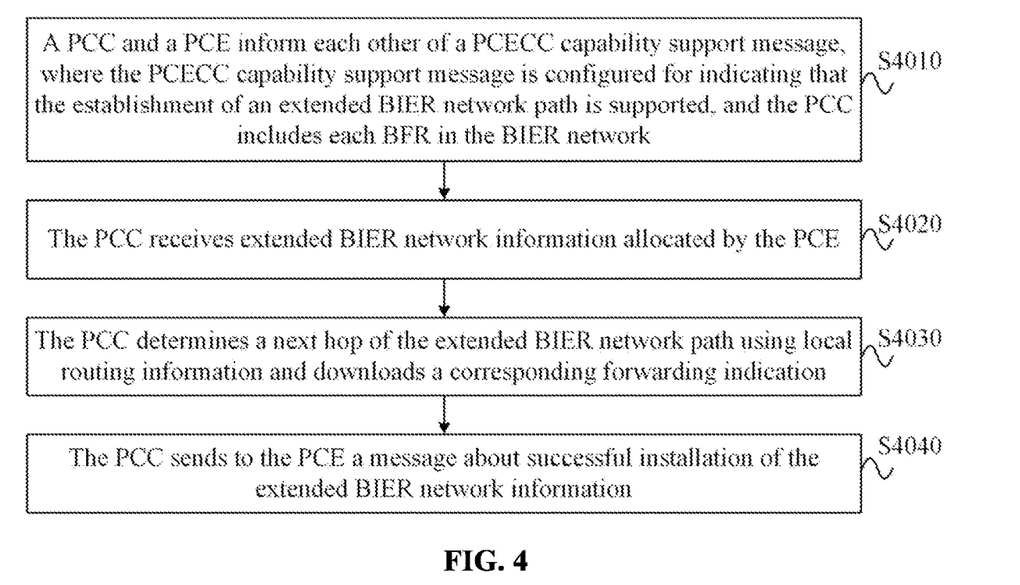
FIG. 4 is another flowchart of a signaling configuration method for a BIER network according to an embodiment.

FIG. 4 is another flowchart of a signaling configuration method for a BIER network according to an embodiment. As shown in FIG. 4, the method provided in this embodiment includes S4010, S4020, S4030 and S4040 described below.

In S4010, a PCC and a PCE inform each other of a PCECC capability support message, where the PCECC capability support message is configured for indicating that the establishment of an extended BIER network path is supported, and the PCC includes each BFR in the BIER network.

The signaling configuration method for a BIER network provided in this embodiment is applied by a PCC in the BIER network. The PCC may be a BFER, a BFIR or an intermediate BFR. To simplify the label distribution and the signaling mechanism for the BIER network, in this embodiment, the PCE and the PCC need to perform capability informing and inform each other that a PCECC capability is supported. The PCE and the PCC perform PCECC capability informing through the PCECC capability support message, where the PCECC capability support message is configured for indicating that the establishment of an extended BIER network path is supported. The extended BIER network path is a new type of path different from paths in the current protocols and aims at optimizing the label distribution mechanism and the signaling transmission mechanism for the BIER network. As long as both the PCE and the PCC support the establishment of the extended BIER network path, the PCE and the PCC can inform each other through the PCECC capability support message that the PCECC capability is supported.

In an embodiment, the PCE and the PCC inform each other of the PCECC capability support message through a PCEP open message.

In S4020, the PCC receives extended BIER network information allocated by the PCE.

After the PCE and the PCC inform each other of the PCECC capability support message, the PCC may receive the extended BIER network information allocated by the PCE. The extended BIER network information allocated by the PCE to the PCC is configured for enabling each BFR to know the information required for routing and forwarding in the extended BIER network path so that traffic can be forwarded in the extended BIER network path.

In an embodiment, the PCC receives the extended BIER network information that is allocated by the PCE and carried in a CCI object through at least one of the following messages: a PCEP initialization message, a PCEP advertisement message, a PCEP update message and other messages for establishing a BIER path.

In S4030, the PCC determines a next hop of the extended BIER network path using local routing information and downloads a corresponding forwarding indication.

In S4040, the PCC sends to the PCE a message about the successful installation of the extended BIER network information.

When the PCC receives the extended BIER network information allocated by the PCE and stores the extended BIER network information, the PCC sends to the PCE the message about the successful installation of the extended BIER network information. After the PCE receives messages about the successful installation of the extended BIER network information sent by all PCCs, the PCE can complete the signaling configuration process for the BIER network. That is, the network path is established in the BIER network, and multiple PCCs can complete traffic forwarding in the BIER network according to the configured information.

The signaling configuration method for a BIER network provided in this embodiment is the processing at the PCC side of the signaling configuration method for a BIER network shown in FIG. 2, where the PCC includes multiple BFRs in the BIER network, and the interaction flows between the multiple BFRs and the PCE are the same. Since the signaling configuration method for a BIER network has been described in the embodiment shown in FIG. 2 and the technical principle of the signaling configuration method for a BIER network provided in this embodiment is similar to the technical principle of the signaling configuration method for a BIER network in the embodiment shown in FIG. 2, the details are not repeated here.

Figure 5:
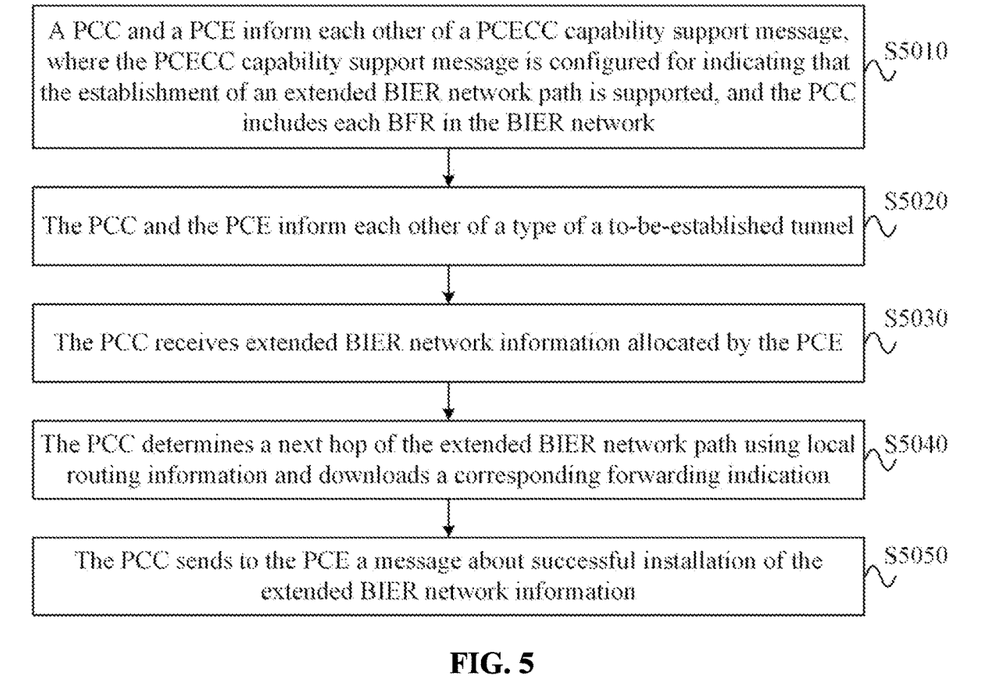
FIG. 5 is another flowchart of a signaling configuration method for a BIER network according to an embodiment.

FIG. 5 is another flowchart of a signaling configuration method for a BIER network according to an embodiment. As shown in FIG. 5, the method provided in this embodiment includes S5010, S5020, S5030, S5040 and S5050 described below.

In S5010, a PCC and a PCE inform each other of a PCECC capability support message, where the PCECC capability support message is configured for indicating that the establishment of an extended BIER network path is supported, and the PCC includes each BFR in the BIER network.

In S5020, the PCC and the PCE inform each other of a type of a to-be-established tunnel.

Since a BIER-TE network (or BIER-TE domain) also exists in addition to the BIER network (or BIER domain), there are different signaling configuration methods for different network paths in the BIER domain and the BIER-TE domain. Therefore, the PCC and the PCE may inform each other of both the PCECC capability support message and the type of the to-be-established tunnel. In this embodiment, a new path setup type needs to be extended to indicate the type of the to-be-established tunnel. After the PCE and the PCC inform each other of the type of the to-be-established tunnel, the PCE may allocate different types of extended BIER network information to the PCC according to different tunnel types.

In an embodiment, the extended BIER network path includes a PCECC-BIER path, and the operation where the PCC and the PCE inform each other of the type of the to-be-established tunnel includes the following: the PCC and the PCE inform each other that the type of the to-be-established tunnel is the PCECC-BIER path; or, the extended BIER network path includes a PCECC-BIER-TE path, and the operation where the PCE and the PCC inform each other of the type of the to-be-established tunnel includes the following: the PCE and the PCC inform each other that the type of the to-be-established tunnel is the PCECC-BIER-TE path.

In an embodiment, the operation where the PCC and the PCE inform each other of the type of the to-be-established tunnel includes the following: the PCC and the PCE inform each other of the type of the to-be-established tunnel through at least one of the following messages: a PCEP initialization message, a PCEP advertisement message, a PCEP update message and other messages for establishing a BIER path.

In S5030, the PCC receives extended BIER network information allocated by the PCE.

If the extended BIER network path includes a PCECC-BIER path, the operation where the PCC receives the extended BIER network information allocated by the PCE includes the following: the PCC receives BIER information allocated by the PCE, where the BIER information includes at least one of the following: BIER sub-domain information, BSL information, a BFR ID corresponding to a BFER, a BIER algorithm, an IGP algorithm, an ingress BIFT ID, an egress BIFT ID and a BFR next hop (which may be an egress interface or may be index information which is associated with an egress interface).

If the extended BIER network path includes a PCECC-BIER-TE path, the operation where the PCC receives the extended BIER network information allocated by the PCE includes the following: the PCC receives BIER-TE information allocated by the PCE, where the BIER-TE information includes at least one of the following: BIER sub-domain information, a SI, a BitPosition of an adjacency, a type of an adjacency BitPosition, BSL information and a BIFT ID (which may be an MPLS label, an Ethernet encapsulation index or the like).

In S5040, the PCC determines a next hop of the extended BIER network path using local routing information and downloads a corresponding forwarding indication.

In S5050, the PCC sends to the PCE a message about the successful installation of the extended BIER network information.

If the extended BIER network path includes a PCECC-BIER path, the PCC sends to the PCE a message about the successful installation of the BIER information. If the extended BIER network path includes a PCECC-BIER-TE path, the PCC sends to the PCE a message about the successful installation of the BIER-TE information.

In an embodiment, in a case where one extended BIER network path is required to be modified, a PCC acting as an ingress node of the extended BIER network path receives a path update message sent by the PCE; the PCC acting as the ingress node of the extended BIER network path downloads an updated bit index, switches traffic and clears an old bit index; and the PCC acting as the ingress node of the extended BIER network path sends a path update response to the PCE, where the path update response is configured for enabling the PCE to clear an old extended BIER network path.

The signaling configuration method for a BIER network provided in the embodiments of the present application is described below using several embodiments.

Figure 6:
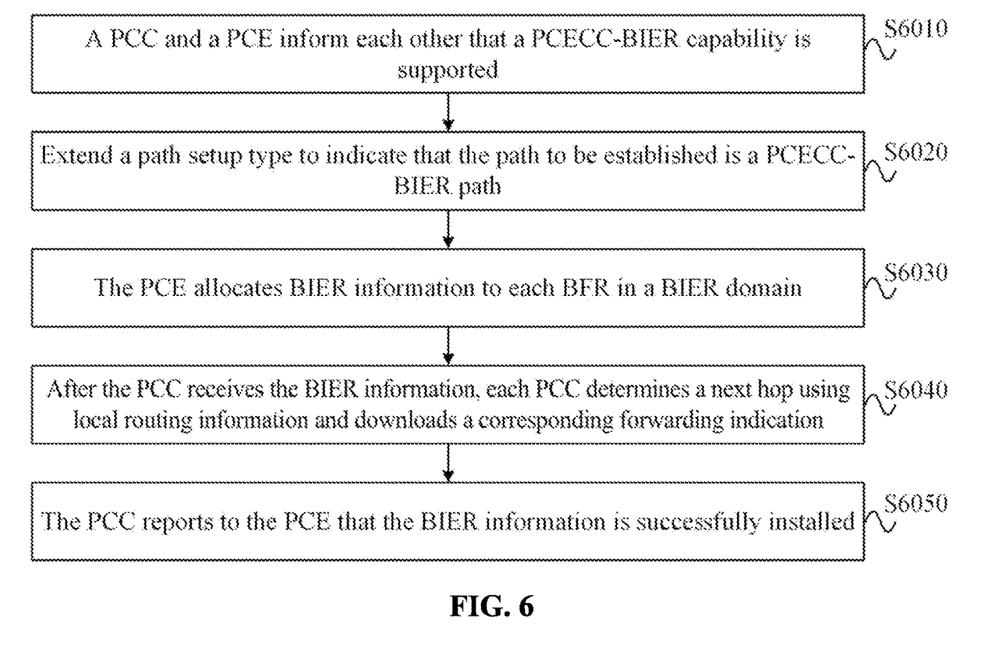
FIG. 6 is another flowchart of a signaling configuration method for a BIER network according to an embodiment.

FIG. 6 is another flowchart of a signaling configuration method for a BIER network according to an embodiment. As shown in FIG. 6, the method provided in this embodiment includes S6010, S6020, S6030, S6040 and S6050 described below.

In S6010, a PCC and a PCE inform each other that a PCECC-BIER capability is supported. That is, the PCE and the PCC inform each other of a PCECC-BIER capability support message.

The PCECC is used as a PCE centralized controller and is an enhanced PCE. The PCECC not only has the computation function of the PCE but also has the functions of the core controller. However, since the PCEP protocol is still used between the PCE and the PCC, in the PCEP initialization phase, the PCE and the PCC need to perform capability informing, that the PCC/PCE supports a PCECC-BIER path setup mode needs to be informed, and a new path setup type needs to be extended to indicate that the path setup is implemented through PCECC-BIER. The new path setup type may be carried in the PCEP initialization message.

In S6020, a path setup type is extended to indicate that the path to be established is a PCECC-BIER path.

In S6030, the PCE allocates BIER information to each BFR in a BIER domain.

The BIER information includes at least one of the following: BIER sub-domain information, BSL information, a BFR ID corresponding to a BFER, a BIER algorithm, an IGP algorithm, an ingress BIFT ID, an egress BIFT ID and a BFR next hop.

In the BIER network, BIER-related information is required when the BIER is forwarded. The BIER-related information includes sub-domain information, BFR ID information, BSL information, SI information (computed through the BFR ID and the BSL), bit string information (computed through the BFR ID and the BSL), an ingress BIFT ID, an egress BIFT ID and a BFR next hop.

The BIER information may be carried in a CCI object and carried in the PCEP initialization message, the PCEP advertisement message, the PCEP update message or other PCEP messages for establishing a BIER path.

The PCE sends the BIER-TE information to the PCC sequentially in the order of an egress node, an intermediate node and an ingress node of the BIER path.

In S6040, after the PCC receives the BIER information, each PCC determines a next hop using local routing information and downloads a corresponding forwarding indication.

In S6050, the PCC reports to the PCE that the BIER information is successfully installed.

Figure 7:
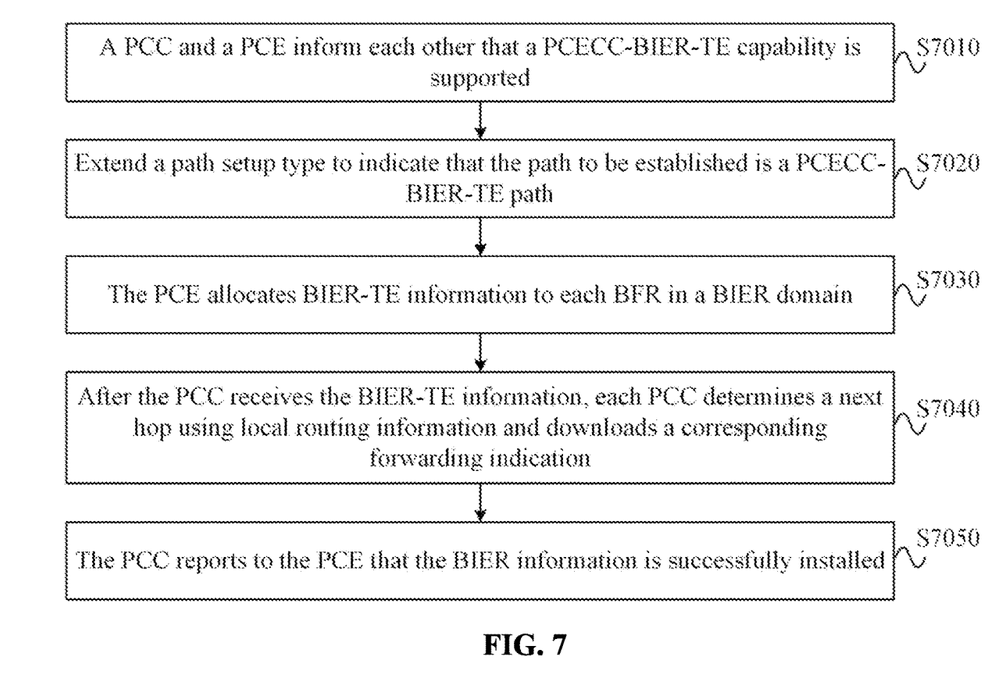
FIG. 7 is another flowchart of a signaling configuration method for a BIER network according to an embodiment.

FIG. 7 is another flowchart of a signaling configuration method for a BIER network according to an embodiment. As shown in FIG. 7, the method provided in this embodiment includes S7010, S7020, S7030, S7040 and S7050 described below.

In S7010, a PCC and a PCE inform each other that a PCECC-BIER-TE capability is supported. That is, the PCE and the PCC inform each other of a PCECC-BIER-TE capability support message.

The PCECC is used as a PCE centralized controller and is an enhanced PCE. The PCECC not only has the computation function of the PCE, but also has the functions of the core controller. However, since the PCEP protocol is still used between the PCE and the PCC, in the PCEP initialization phase, the PCE and the PCC needs to perform capability informing, that the PCC/PCE supports a PCECC-BIER-TE path setup mode needs to be informed, and a new path setup type needs to be extended to indicate that the path setup is implemented through PCECC-BIER-TE. The new path setup type may be carried in the PCEP initialization message.

In S7020, a path setup type is extended to indicate that the path to be established is a PCECC-BIER-TE path.

In S7030, the PCE allocates BIER-TE information to each BFR in a BIER domain.

The BIER-TE information includes at least one of the following: BIER sub-domain information, a SI, a BitPosition of an adjacency, a type of an adjacency BitPosition, BSL information and a BIFT ID (which may be an MPLS label, an Ethernet encapsulation index or the like).

Different from BIER, the path of BIER-TE is independent of the IGP protocol. The path of the BIER-TE is computed by the PCE, and the ingress node of the BIER is informed of the computed path. Draft-chen-pce-bier in IETF extends PCEP to support a stateful PCE to compute and initialize the BIER path and support the PCC to request a path object having specific constraints and optimization criteria. For the BIER-TE network, the PCECC needs to inform the PCE to compute and initialize the path, and the PCECC also needs to allocate one Adj-ID (bit position) to each adjacency. The PCE sends the PCEP initialization message to a relevant node in the BIER sub-domain to update the bit forwarding indication of each neighboring node, and each node (PCC) downloads a bit index forwarding indication.

The BIER-TE information may be carried in a CCI object and carried in the PCEP initialization message, the PCEP advertisement message, the PCEP update message or other PCEP messages for establishing a BIER path.

The PCE sends the BIER-TE information to the PCC sequentially in the order of an egress node, an intermediate node and an ingress node of the BIER path.

In S7040, after the PCC receives the BIER-TE information, each PCC determines a next hop using local routing information and downloads a corresponding forwarding indication.

In S7050, the PCC reports to the PCE that the BIER information is successfully installed.

Figure 8:
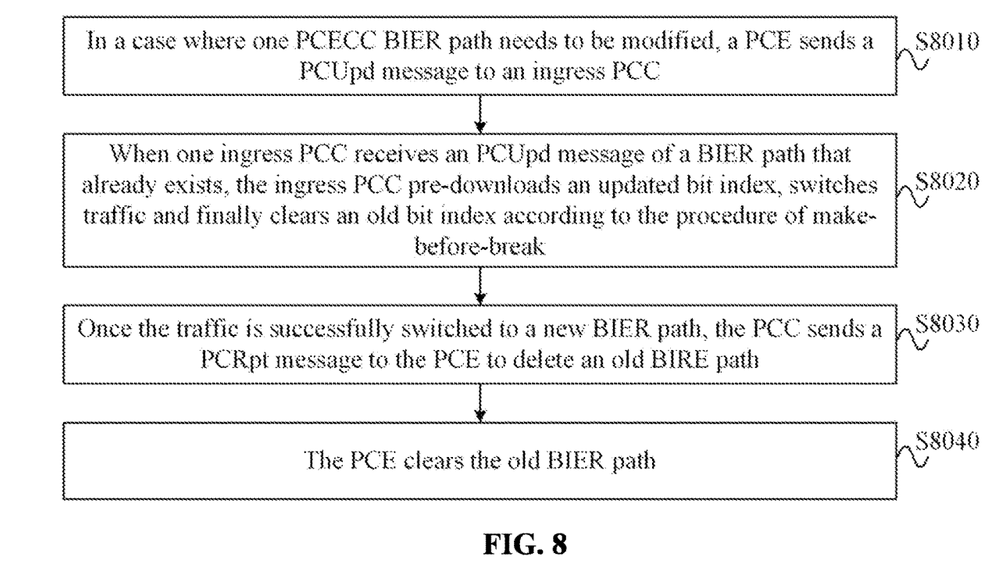
FIG. 8 is another flowchart of a signaling configuration method for a BIER network according to an embodiment.

FIG. 8 is another flowchart of a signaling configuration method for a BIER network according to an embodiment. As shown in FIG. 8, the method provided in this embodiment includes S8010, S8020, S8030 and S8040 described below.

In S8010, in a case where one PCECC BIER path needs to be modified, a PCE sends a PCUpd message to an ingress PCC.

In S8020, when one ingress PCC receives a PCUpd message of a BIER path that already exists, the ingress PCC pre-downloads an updated bit index, switches traffic and finally clears an old bit index according to the procedure of make-before-break.

In S8030, once the traffic is successfully switched to a new BIER path, the PCC sends a PCRpt message to the PCE to delete an old BIER path.

In S8040, the PCE clears the old BIER path.

Figure 9:
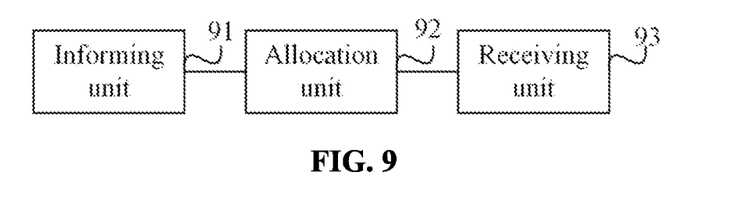
FIG. 9 is a structural diagram of a signaling configuration apparatus for a BIER network according to an embodiment.

FIG. 9 is a structural diagram of a signaling configuration apparatus for a BIER network according to an embodiment. As shown in FIG. 9, the signaling configuration apparatus for a BIER network provided in this embodiment is configured in a PCE and includes an informing unit 91, an allocation unit 92 and a receiving unit 93. The informing unit 91 is configured to inform the PCE and a PCC of a PCECC capability support message, where the PCECC capability support message is configured for indicating that the establishment of an extended BIER network path is supported, and the PCC includes each BFR in the BIER network. The allocation unit 92 is configured to allocate extended BIER network information to each BFR in the BIER network. The receiving unit 93 is configured to receive a message about the successful installation of the extended BIER network information sent by the PCC.

The signaling configuration apparatus for a BIER network provided in this embodiment is configured to implement the signaling configuration method for a BIER network in the embodiment shown in FIG. 2. The implementation principle of the signaling configuration apparatus for a BIER network provided in this embodiment is similar to the implementation principle of the signaling configuration method for a BIER network in the embodiment shown in FIG. 2, and the details are not repeated here.

Figure 10:
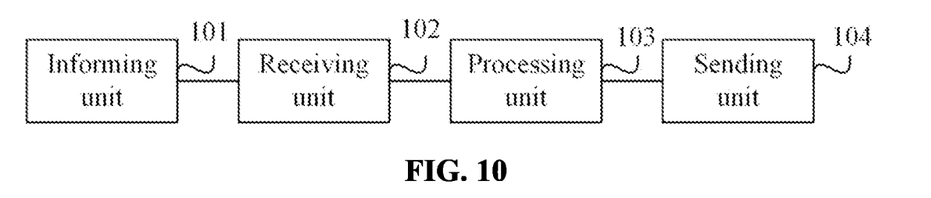
FIG. 10 is another structural diagram of a signaling configuration apparatus for a BIER network according to an embodiment.

FIG. 10 is another structural diagram of a signaling configuration apparatus for a BIER network according to an embodiment. As shown in FIG. 10, the signaling configuration apparatus for a BIER network provided in this embodiment is configured in a PCC and includes an informing unit 101, a receiving unit 102, a processing unit 103 and a sending unit 104.

The informing unit 101 is configured to inform the PCC and a PCE each other of a PCECC capability support message, where the PCECC capability support message is configured for indicating that the establishment of an extended BIER network path is supported, and the PCC includes each BFR in the BIER network. The receiving unit 102 is configured to receive extended BIER network information allocated by the PCE. The processing unit 103 is configured to determine a next hop of the extended BIER network path using local routing information and download a corresponding forwarding instruction. The sending unit 104 is configured to send a message about the successful installation of the extended BIER network information sent by the PCE.

The signaling configuration apparatus for a BIER network provided in this embodiment is configured to implement the signaling configuration method for a BIER network in the embodiment shown in FIG. 5. The implementation principle of the signaling configuration apparatus for a BIER network provided in this embodiment is similar to the implementation principle of the signaling configuration method for a BIER network in the embodiment shown in FIG. 5, and the details are not repeated here.

Figure 11:
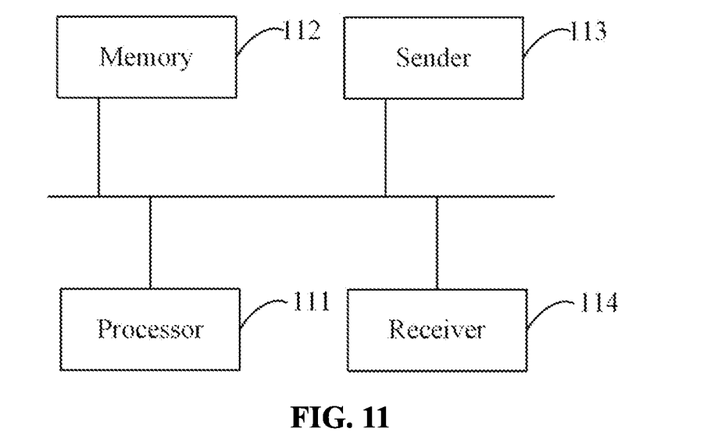
FIG. 11 is a structural diagram of a PCE according to an embodiment.

FIG. 11 is a structural diagram of a PCE according to an embodiment. As shown in FIG. 11, the PCE includes a processor 111, a memory 112, a sender 113 and a receiver 114. The number of processors 111 in the PCE may be one or more, and one processor 111 is shown as an example in FIG. 11. The processor 111, the memory 112, the sender 113 and the receiver 114 in the PCE may be connected via a bus or in other manners, and the connection via the bus is shown as an example in FIG. 11.

As a computer-readable storage medium, the memory 112 may be configured to store software programs and computer-executable programs and modules, such as program instructions/modules (for example, the informing unit 91, the allocation unit 92 and the receiving unit 93 in the signaling configuration apparatus for a BIER network) corresponding to the signaling configuration method for a BIER network in the embodiments shown in FIGS. 2 and 3 of the present application. The processor 111 runs the software programs, instructions and modules that are stored in the memory 112 to complete at least one of the function applications and data processing of the PCE, that is, to implement the preceding signaling configuration method for a BIER network.

The memory 112 may mainly include a program storage region and a data storage region. The program storage region may store an operating system and an application program required for at least one function, and the data storage region may store data created according to the use of the PCE. In addition, the memory 112 may include a high-speed random-access memory, and may also include a non-volatile memory such as at least one disk memory, flash memory or another non-volatile solid-state memory.

The sender 113 is a module or device combination for data sending or signaling sending in the BIER network. The receiver 114 is a module or device combination for data receiving or signaling receiving in the BIER network.

Figure 12:
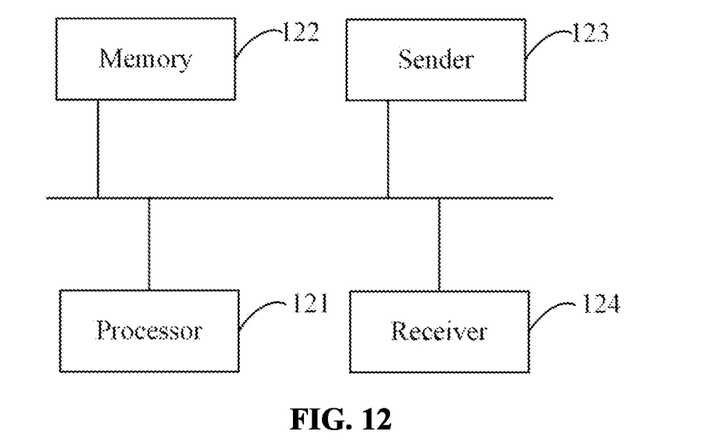
FIG. 12 is a structural diagram of a PCC according to an embodiment.

FIG. 12 is a structural diagram of a PCC according to an embodiment. As shown in FIG. 12, the PCC includes a processor 121, a memory 122, a sender 123 and a receiver 124. The number of the processor 121 in the PCC may be one or more, and one processor 121 is shown as an example in FIG. 12. The processor 121, the memory 121, the sender 122 and the receiver 124 in the PCC may be connected via a bus or in other manners, and the connection via the bus is shown as an example in FIG. 12.

As a computer-readable storage medium, the memory 122 may be configured to store software programs and computer-executable programs and modules, such as program instructions/modules (for example, the informing unit 101, the receiving unit 102, the processing unit 103 and the sending unit 104 in the signaling configuration apparatus for a BIER network) corresponding to the signaling configuration method for a BIER network in the embodiments shown in FIGS. 4 and 5 of the present application. The processor 121 runs the software programs, instructions and modules that are stored in the memory 122 to complete at least one of the function applications and data processing of the PCC, that is, to implement the preceding signaling configuration method for a BIER network.

The memory 122 may mainly include a program storage region and a data storage region. The program storage region may store an operating system and an application program required for at least one function, and the data storage region may store data created according to the use of the PCC. The memory 122 may include a high-speed random-access memory, and may also include a non-volatile memory such as at least one disk memory, flash memory or another non-volatile solid-state memory.

The sender 123 is a module or device combination for data sending or signaling sending in the BIER network. The receiver 124 is a module or device combination for data receiving or signaling receiving in the BIER network.

An embodiment of the present application further provides a storage medium including computer-executable instructions, and the computer-executable instructions are used for, when executed by a computer processor, performing a signaling configuration method for a BIER network, and the method includes the following: a PCE and a PCC inform each other of a PCECC capability support message, where the PCECC capability support message is configured for indicating that the establishment of an extended BIER network path is supported, and the PCC includes each BFR in the BIER network; the PCE allocates extended BIER network information to each BFR in the BIER network; and the PCE receives a message about the successful installation of the extended BIER network information.

An embodiment of the present application further provides a storage medium including computer-executable instructions, and the computer-executable instructions are used for, when executed by a computer processor, performing a signaling configuration method for a BIER network, and the method includes the following: a PCC and a PCE inform each other of a PCECC capability support message, where the PCECC capability support message is configured for indicating that the establishment of an extended BIER network path is supported, and the PCC includes one BFR in the BIER network; the PCC receives extended BIER network information allocated by the PCE; the PCC determines a next hop of the extended BIER network path using local routing information and downloads a corresponding forwarding indication; and the PCC sends to the PCE a message about the successful installation of the extended BIER network information.

The above are only exemplary embodiments of the present application and are not intended to limit the protection scope of the present application.

It is to be understood by those skilled in the art that the term user terminal encompasses any appropriate type of wireless user device, such as a mobile phone, a portable data processing apparatus, a portable web browser or a vehicle-mounted mobile station.

In general, multiple embodiments of the present application may be implemented in hardware or special-purpose circuits, software, logic, or any combination thereof. For example, some aspects may be implemented in hardware, while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, such as in a processor entity, or by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions or may represent a combination of program steps with logic circuits, modules, and functions. A computer program may be stored in a memory. The memory may be of any type suitable for a local technical environment and may be implemented using any suitable data storage technology, such as, but not limited to, a read-only memory (ROM), a random-access memory (RAM), and an optical memory device and system (a digital video disc (DVD) or a compact disk (CD)). The computer-readable media may include a non-transitory storage medium. The data processor may be of any type suitable to the local technical environment such as, but not limited to, a general-purpose computer, a special-purpose computer, a microprocessor, digital signal processing (DSP), an application-specific integrated circuit (ASIC), a field-programmable gate array (FPGA) and a processor based on a multi-core processor architecture.

What is claimed is:

1. A signaling configuration method for a Bit Indexed Explicit Replication (BIER) network, comprising:
    informing, by a path computation element (PCE) and each path computation client (PCC) among a plurality of PCCs each other, of a Path Computation Element as a Central Controller (PCECC) capability support message, wherein the PCE and the each PCC inform each other of the PCECC capability support message, the PCECC capability support message is configured for indicating that establishment of an extended BIER network path is supported, and the plurality of PCCs comprise each bit-forwarding router (BFR) in the BIER network;
    allocating, by the PCE, extended BIER network information to the each BFR in the BIER network; and
    receiving, by the PCE, a message about successful installation of the extended BIER network information sent by each PCC;
    wherein before the allocating, by the PCE, extended BIER network information to each BFR in the BIER network, the method further comprises:
    informing, by the PCE and each PCC each other, of a type of a to-be-established tunnel;
    wherein the type of the to-be-established tunnel comprises: a Path Computation Element as a Central Controller-Bit Indexed Explicit Replication (PCECC-BIER) path or a Path Computation Element as a Central Controller-Bit Indexed Explicit Replication-Traffic Engineering (PCECC-BIER-TE) path.

2. The method of claim 1, wherein the extended BIER network path comprises the PCECC-BIER path; and
    wherein the informing, by the PCE and each PCC each other, of a type of a to-be-established tunnel comprises:

informing, by the PCE and each PCC each other, that the type of the to-be-established tunnel is the PCECC-BIER path.

3. The method of claim 2, wherein the allocating, by the PCE, extended BIER network information to each BFR in the BIER network comprises:
allocating, by the PCE, BIER information to each BFR in the BIER network, wherein the BIER information comprises at least one of the following: BIER sub-domain information, bit string length (BSL) information, a BFR identifier corresponding to a bit-forwarding egress router (BFER), a BIER algorithm, an interior gateway protocol (IGP) algorithm, an ingress bit index forwarding table (BIFT) identifier, an egress BIFT identifier, and a BFR next hop.

4. The method of claim 1, wherein the extended BIER network path comprises the PCECC-BIER-TE path; and
wherein the informing, by the PCE and each PCC each other, of a type of a to-be-established tunnel comprises:
informing, by the PCE and each PCC each other, that the type of the to-be-established tunnel is the PCECC-BIER-TE path;
wherein the allocating, by the PCE, extended BIER network information to each BFR in the BIER network comprises:
allocating, by the PCE, Bit Indexed Explicit Replication-Traffic Engineering (BIER-TE) information to each BFR in the BIER network, wherein the BIER-TE information comprises at least one of the following: BIER sub-domain information, a set identifier (SI), a BitPosition of an adjacency, a type of an adjacency BitPosition, BSL information, and a BIFT identifier.

5. The method of claim 1, wherein the informing, by a PCE and each PCC each other, of a PCECC capability support message comprises:
informing, by the PCE and each PCC each other, of the PCECC capability support message through a Path Computation Element Communication Protocol (PCEP) open message.

6. The method of claim 1, wherein the informing, by the PCE and each PCC each other, of a type of a to-be-established tunnel comprises:
informing, by the PCE and each PCC each other, of the type of the to-be-established tunnel through at least one of the following messages:
a PCEP initialization message, a PCEP advertisement message, a PCEP update message, and other messages for establishing a BIER path.

7. The method of claim 1, wherein the allocating, by the PCE, extended BIER network information to each BFR in the BIER network comprises:
carrying, by the PCE, the extended BIER network information in a central controller's instruction (CCI) object, and allocating the extended BIER network information to each BFR in the BIER network through at least one of the following messages:
a PCEP initialization message, a PCEP advertisement message, a PCEP update message, and other messages for establishing a BIER path.

8. The method of claim 1, wherein the allocating, by the PCE, extended BIER network information to each BFR in the BIER network comprises:
sequentially allocating, by the PCE, the extended BIER network information to an egress node, an intermediate node and an ingress node of the extended BIER network path in an order of the extended BIER network path.

9. The method of claim 8, further comprising:
sending, by the PCE, a path update message to the ingress node, wherein the path update message is configured for enabling the ingress node to download an updated bit index, switch traffic and clear an old bit index; and
receiving, by the PCE, a path update response sent by the ingress node, and clearing an old extended BIER network path;
wherein the old bit index is a bit index before the ingress node receives the path update message.

10. A signaling configuration method for a Bit Indexed Explicit Replication (BIER) network, comprising:
informing, by a path computation client (PCC) and a path computation element (PCE) each other, of a Path Computation Element as a Central Controller (PCECC) capability support message, wherein the PCE and the PCC inform each other of the PCECC capability support message, the PCECC capability support message is configured for indicating that establishment of an extended BIER network path is supported, and the PCC comprises one bit-forwarding router (BFR) in the BIER network;
receiving, by the PCC, extended BIER network information allocated by the PCE;
determining, by the PCC, a next hop of the extended BIER network path using local routing information, and downloading a corresponding forwarding indication; and
sending, by the PCC to the PCE, a message about successful installation of the extended BIER network information;
wherein before the receiving, by the PCC, extended BIER network information allocated by the PCE, the method further comprises:
informing, by the PCC and the PCE each other, of a type of a to-be-established tunnel;
wherein the type of the to-be-established tunnel comprises: a Path Computation Element as a Central Controller-Bit Indexed Explicit Replication (PCECC-BIER) path or a Path Computation Element as a Central Controller-Bit Indexed Explicit Replication-Traffic Engineering (PCECC-BIER-TE) path.

11. The method of claim 10, wherein the extended BIER network path comprises the PCECC-BIER path; and
wherein the informing, by the PCC and the PCE each other, of a type of a to-be-established tunnel comprises:
informing, by the PCC and the PCE each other, that the type of the to-be-established tunnel is the PCECC-BIER path.

12. The method of claim 11, wherein the receiving, by the PCC, extended BIER network information allocated by the PCE comprises:
receiving, by the PCC, BIER information allocated by the PCE, wherein the BIER information comprises at least one of the following: BIER sub-domain information, bit string length (BSL) information, a BFR identifier corresponding to a bit-forwarding egress router (BFER), a BIER algorithm, an interior gateway protocol (IGP) algorithm, an ingress bit index forwarding table (BIFT) identifier, an egress BIFT identifier, and a BFR next hop.

13. The method of claim 10, wherein the extended BIER network path comprises a Path Computation Element as the PCECC-BIER-TE path; and
wherein the informing, by the PCC and the PCE each other, of a type of a to-be-established tunnel comprises:

informing, by the PCC and the PCE each other, that the type of the to-be-established tunnel is the PCECC-BIER-TE path;

wherein the receiving, by the PCC, extended BIER network information allocated by the PCE comprises:

receiving, by the PCC, the extended BIER network information allocated by the PCE; and receiving, by the PCC, Bit Indexed Explicit Replication-Traffic Engineering (BIER-TE) information allocated by the PCE, wherein the BIER-TE information comprises at least one of the following: BIER sub-domain information, a set identifier (SI), a BitPosition of an adjacency, a type of an adjacency BitPosition, BSL information, and a BIFT identifier.

14. The method of claim 10, wherein the informing, by a PCC and a PCE each other, of a PCECC capability support message comprises:

informing, by the PCC and the PCE each other, of the PCECC capability support message through a Path Computation Element Communication Protocol (PCEP) open message.

15. The method of claim 10, wherein the informing, by the PCC and the PCE each other, of a type of a to-be-established tunnel comprises:

informing, by the PCC and the PCE each other, of the type of the to-be-established tunnel through at least one of the following messages:

a PCEP initialization message, a PCEP advertisement message, a PCEP update message, and other messages for establishing a BIER path.

16. The method of claim 10, wherein the receiving, by the PCC, extended BIER network information allocated by the PCE comprises:

receiving, by the PCC, the extended BIER network information, which is allocated by the PCE after the PCE carries the extended BIER network information in a central controller's instruction (CCI) object, through at least one of the following messages:

a PCEP initialization message, a PCEP advertisement message, a PCEP update message, and other messages for establishing a BIER path.

17. The method of claim 10, further comprising:

receiving, by a PCC acting as an ingress node of the extended BIER network path, a path update message sent by the PCE;

downloading, by the PCC acting as the ingress node of the extended BIER network path, an updated bit index, switching traffic, and clearing an old bit index; and sending, by the PCC acting as the ingress node of the extended BIER network path, a path update response to the PCE, wherein the path update response is configured for enabling the PCE to clear an old extended BIER network path, and the old bit index is a bit index before the ingress node receives the path update message.

18. A non-transitory computer-readable storage medium storing a computer program, wherein the computer program, when executed by a processor, implements the signaling configuration method of claim 1.

* * * * *